United States Patent [19]

Rippingale et al.

[11] Patent Number: 5,206,065
[45] Date of Patent: Apr. 27, 1993

[54] METHODS, APPARATUS AND DEVICES RELATING TO MAGNETIC MARKERS FOR ELONGATED HIDDEN OBJECTS

[75] Inventors: John B. Rippingale, Leesburg; Erick O. Schonstedt, Reston, both of Va.

[73] Assignee: Schonstedt Instrument Company, Reston, Va.

[21] Appl. No.: 834,155

[22] Filed: Feb. 12, 1992

Related U.S. Application Data

[60] Division of Ser. No. 477,447, Feb. 9, 1990, Pat. No. 5,114,517, which is a continuation-in-part of Ser. No. 428,757, Oct. 30, 1989, Pat. No. 5,006,806, which is a continuation-in-part of Ser. No. 323,860, Mar. 15, 1989, abandoned.

[51] Int. Cl.$^5$ .............................................. B32B 3/28
[52] U.S. Cl. ................................... 428/98; 428/371; 428/592; 428/900; 428/906
[58] Field of Search ............... 428/900, 371, 592, 98; 156/196

[56] References Cited

U.S. PATENT DOCUMENTS

| | | | |
|---|---|---|---|
| Re. 30,393 | 9/1980 | Sherlock | 174/37 |
| 2,854,840 | 10/1958 | Anderson | 72/16 |
| 2,981,885 | 4/1961 | Schonstedt | 29/605 |
| 3,051,988 | 9/1962 | Baermann | 18/12 |
| 3,254,859 | 6/1966 | Reisch | 242/68.5 |
| 3,257,586 | 6/1966 | Steingroever | 317/158 |
| 3,568,626 | 3/1971 | Southworth, Jr. | 116/114 |
| 3,732,617 | 5/1973 | Rowe et al. | 29/608 |
| 3,843,438 | 10/1974 | Gabriel | 156/244.13 |
| 4,107,601 | 8/1978 | Barmeier, Jr. et al. | 324/173 |
| 4,327,346 | 4/1982 | Tada et al. | 264/24 |
| 4,449,098 | 5/1984 | Nakamura et al. | 324/326 |
| 4,459,168 | 7/1984 | Anselm | 156/244.13 |
| 4,508,500 | 4/1985 | French | 425/388 |
| 4,562,019 | 12/1985 | Inoue | 264/24 |
| 4,575,326 | 3/1986 | French | 425/71 |
| 4,661,053 | 4/1987 | Yokota et al. | 425/3 |
| 4,747,207 | 5/1988 | Schonstedt et al. | 29/609 |
| 4,803,773 | 2/1989 | Schonstedt | 29/605 |
| 5,006,806 | 4/1991 | Rippingale et al. | 324/326 |
| 5,017,873 | 5/1991 | Rippingale et al. | 324/326 |
| 5,036,210 | 7/1991 | Goodman | 235/493 |
| 5,051,034 | 9/1991 | Goodman | 405/157 |

FOREIGN PATENT DOCUMENTS

| | | |
|---|---|---|
| 1052559 | 3/1959 | Fed. Rep. of Germany. |
| 60-82881 | 5/1985 | Japan. |
| 1-54280 | 3/1989 | Japan. |

OTHER PUBLICATIONS

B. F. Goodrich, "Koroseal Flexible Magnetic Sheet & Strip from B F Goodrich," Brochure, Nov. 1986.

*Primary Examiner*—Alexander S. Thomas
*Attorney, Agent, or Firm*—Shapiro and Shapiro

[57] ABSTRACT

A magnetic marker serving to locate, trace, and identify an elongated hidden object, such as a buried utility pipe, duct, conduit, or fiber optic cable, is manufactured by applying magnetic material to a substrate that is elongated and by forming from the material a helical or twisted permanent magnet pattern extending along the length of the substrate. The magnetic material, which may be coextensive with the substrate or applied to a portion only of the substrate, may be formed as a strip coextruded with the substrate and magnetized in the direction of the width of the strip. Alternatively, magnetic material may be mixed with the material from which the substrate is extruded or may be coated on the substrate. A strip may also be preformed and applied to an elongated object as the object is buried, or the strip may form a separate warning tape that is buried with the object and that is provided with a desired magnetic signature by twisting the strip lengthwise as it is advanced for burial.

1 Claim, 8 Drawing Sheets

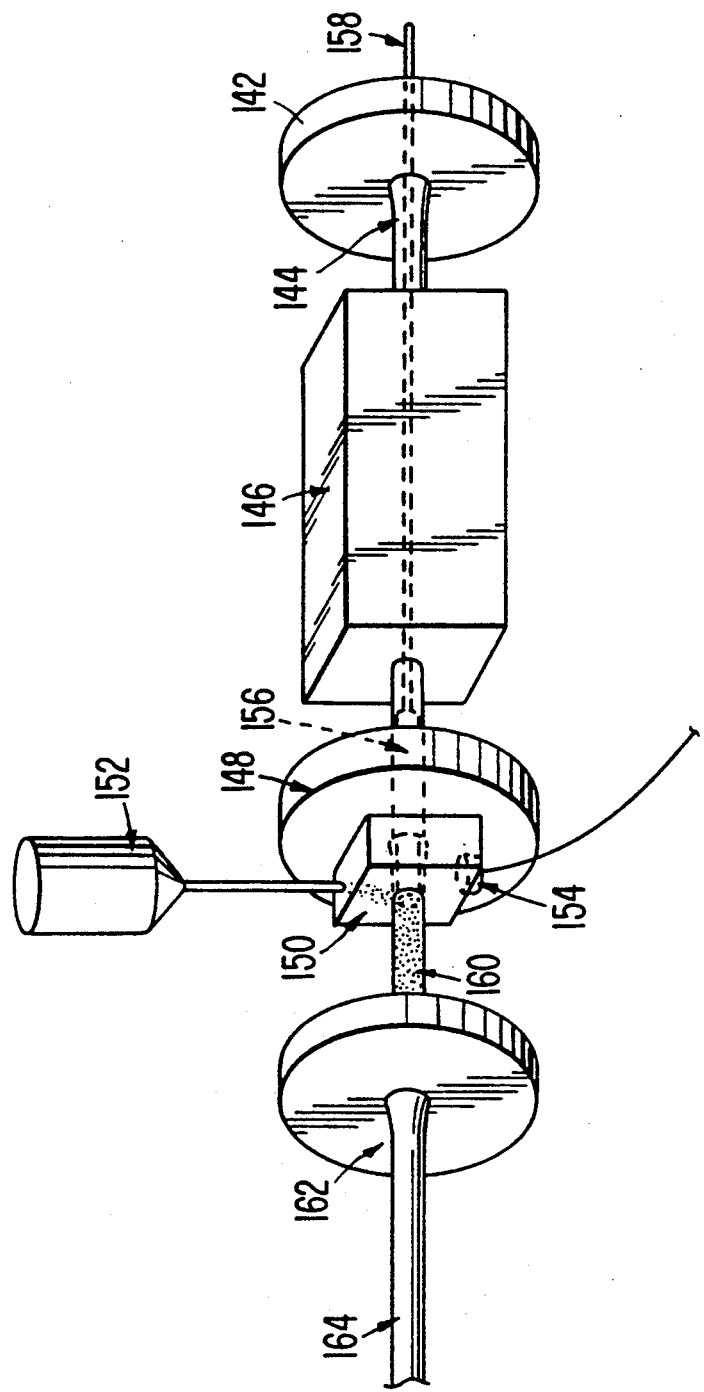

METHODS, APPARATUS AND DEVICES RELATING TO MAGNETIC MARKERS FOR ELONGATED HIDDEN OBJECTS

REFERENCE TO CO-PENDING RELATED APPLICATIONS

This is a division of Ser. No. 477,447 filed Feb. 9, 1990, now U.S. Pat. No. 5,114,517 which is a continuation-in-part of Ser. No. 428,757, filed Oct. 30, 1989, now U.S. Pat. No. 5,006,806 issued Apr. 9, 1991, which is a continuation-in-part of Ser. No. 323,860, filed Mar. 15, 1989 (abandoned).

BACKGROUND OF THE INVENTION

This invention is concerned with magnetic markers that are used in the detection of hidden elongated objects, such as buried plastic utility pipes, ducts or conduits, or fiber optic cables. The invention is concerned, more particularly, with elongated helical or twisted magnetic markers, i.e., convoluted magnetic markers, and with the manufacture of such magnetic markers and others.

The aforesaid co-pending applications disclose and claim new and improved methods and apparatus for marking, locating, tracing, and identifying hidden elongated objects, such as buried, non-conductive cables (e.g., fiber optic cables) and non-conductive pipes, tubes, ducts, and conduits. In one form of the invention disclosed and claimed in the co-pending applications, a magnetic marker comprises an elongated permanent magnet device that is provided on an elongated hidden object to be detected, with the length of the device extending along the length of the object. The device comprises a helical strip magnetized in the direction of its width. With such a device the orientation of the magnetic axis varies at different positions along the length of the object to provide a magnetic field signature for locating, tracing, and identifying the object.

BRIEF DESCRIPTION OF THE INVENTION

In one of its broader aspects, the present invention is concerned with methods and apparatus for making a magnetic marker, in which magnetic material is applied to a substrate that is elongated, and in which the material is formed into a permanent magnet helical pattern having a helix axis extending along the length of the substrate.

In another of its broader aspects, the invention is concerned with a magnetic marker comprising an elongated, flexible magnetic strip magnetized transverse to its length and twisted lengthwise.

In yet another of its broader aspects, the invention is concerned with methods and apparatus for providing elongated magnetic markers in situ as an elongated object is buried. In one form of the invention, a magnetic marking tape is wrapped about the object helically as the object is buried. In another form of the invention, a magnetic marking tape is buried above an elongated object as the object is buried, and the tape is twisted lengthwise as it is advanced for burial.

In still another of its broader aspects, the invention is concerned with methods and apparatus for making a magnetically marked plastic tube, in which magnetic particles (provided, e.g., as a suspension) are attracted to the outer surface of a plastic tube by a magnetic field (e.g., from a magnet inserted in the tube) and are adhered to the surface of the tube (e.g., by adhesive) to form a coating of magnetic particles on the surface of the tube.

BRIEF DESCRIPTION OF THE DRAWINGS

The invention will be further described in conjunction with the accompanying drawings, which illustrate preferred and exemplary (best mode) embodiments, wherein:

FIG. 10 is a diagrammatic perspective view of apparatus employed in another embodiment of the invention.

DETAILED DESCRIPTION OF THE INVENTION

Figure 1:
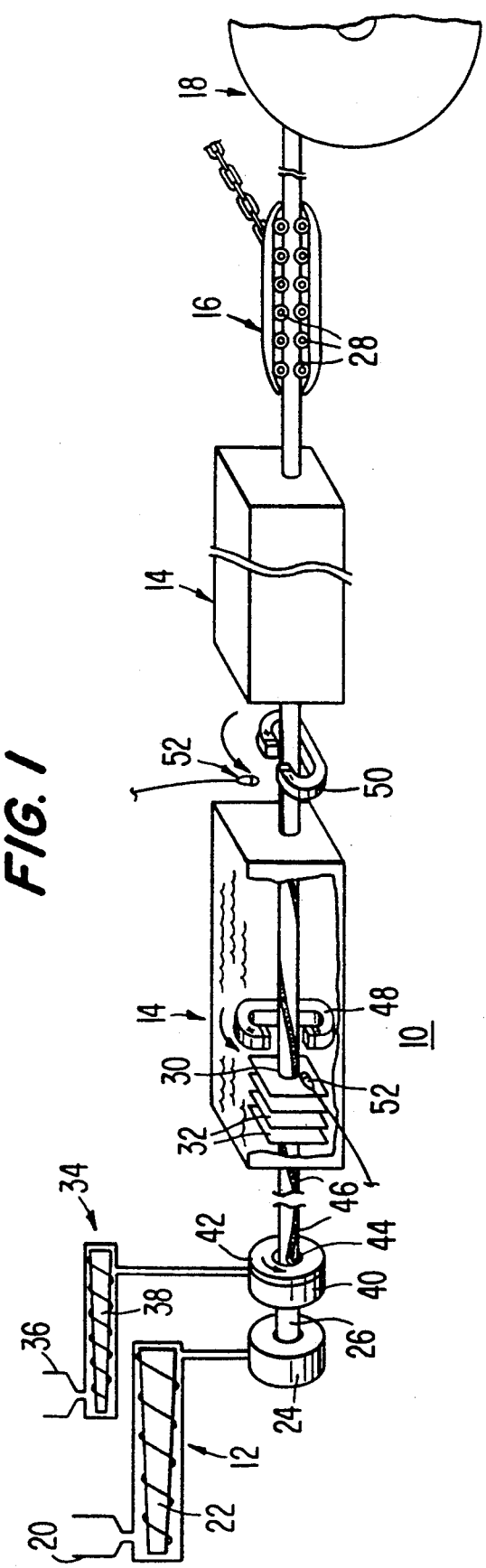
FIG. 1 is a diagrammatic perspective view of apparatus employed in one embodiment of the invention.

The apparatus 10 shown in FIG. 1 is for the manufacture of plastic duct, pipe, or tubing incorporating a helical magnetic marker, by coextrusion. Apparatus for manufacturing duct having electrical cable extending through it is disclosed, for example, in U.S. Pat. Nos. 4,508,500 and 4,575,326, incorporated herein by reference. Such apparatus may comprise an extruder 12, one or more sizer/cooler units 14, a drive unit 16, and a take-up spool 18. The extruder 12 may comprise a hopper 20 for supplying resin pellets, such as polyethylene, to a heated extrusion screw 22, which supplies melted plastic under pressure to an extruder head 24 having a die for extruding soft plastic in the form of a cylindrical duct, pipe, or tube 26. The tube is advanced through the sizer/cooler units 14 by the drive unit 16, which may comprise a plurality of motor-driven rollers 28 shaped for engagement with the cylindrical surface of the tube. The tube is extruded somewhat oversize and is pulled through holes 30 in a series of sizing plates 32 in the sizer/cooler units. These units may be under vacuum and may contain a cooling water bath. The interior of the tube may be pressurized.

In accordance with the invention, a second extruder 34 is provided in tandem with the first extruder. The second extruder comprises a hopper 36 and a heated extrusion screw 38, like the first extruder, but the extruder head 40 of the second extruder comprises a rotatable die 42 with an outlet 44 that rotates slowly about the axis of the cylindrical tube 26. Suitable seals are provided between the rotating and stationary parts of the extrusion head, the rotating parts being driven by a motor (not shown). The material extruded from the die is a plastic base material, such as polyethylene, to which has been added high coercivity magnetic material, such as barium ferrite. The magnetic material employed in the invention is preferably non-conductive and is preferably applied to a non-conductive substrate that is non-magnetic.

As the tube is advanced from the first extruder head 24, the second extruder head 40 applies a strip 46 of magnetic material to the outer surface of the tube, and, by virtue of the rotation of the outlet of the second extruder head, the strip is formed into a long-pitch helix having its helix axis parallel to the length of the tube. The pitch of the helical strip will depend upon the rate of rotation of the second extruder head relative to the rate at which the tube is advanced lengthwise. As the assembly of the tube and strip is drawn through the sizing plates 32, the strip becomes embedded in the still soft plastic material of the tube.

To form a magnetic marker in accordance with the invention, the strip 46 must be permanently magnetized. For this purpose, two rotating magnetizing heads 48, 50 are shown diagrammatically in FIG. 1. In practice, electromagnetic heads may be used, although permanent magnet heads may also be used if the field intensity is sufficient. Each head is rotated about the axis of the tube by a motor drive (not shown). The first head 48 is an alignment head that aligns and packs the magnetic particles while the plastic is still soft. This head applies a relatively weak magnetic field to prevent distortion of the magnetic material while the plastic is still soft. The second head 50 applies a much stronger magnetic field after the plastic material has cooled sufficiently to be stable. This head may be much closer to the magnetic material than the first head. In each case, the magnetic field is applied so as to be parallel to the width of the strip of magnetic material.

Figure 2:
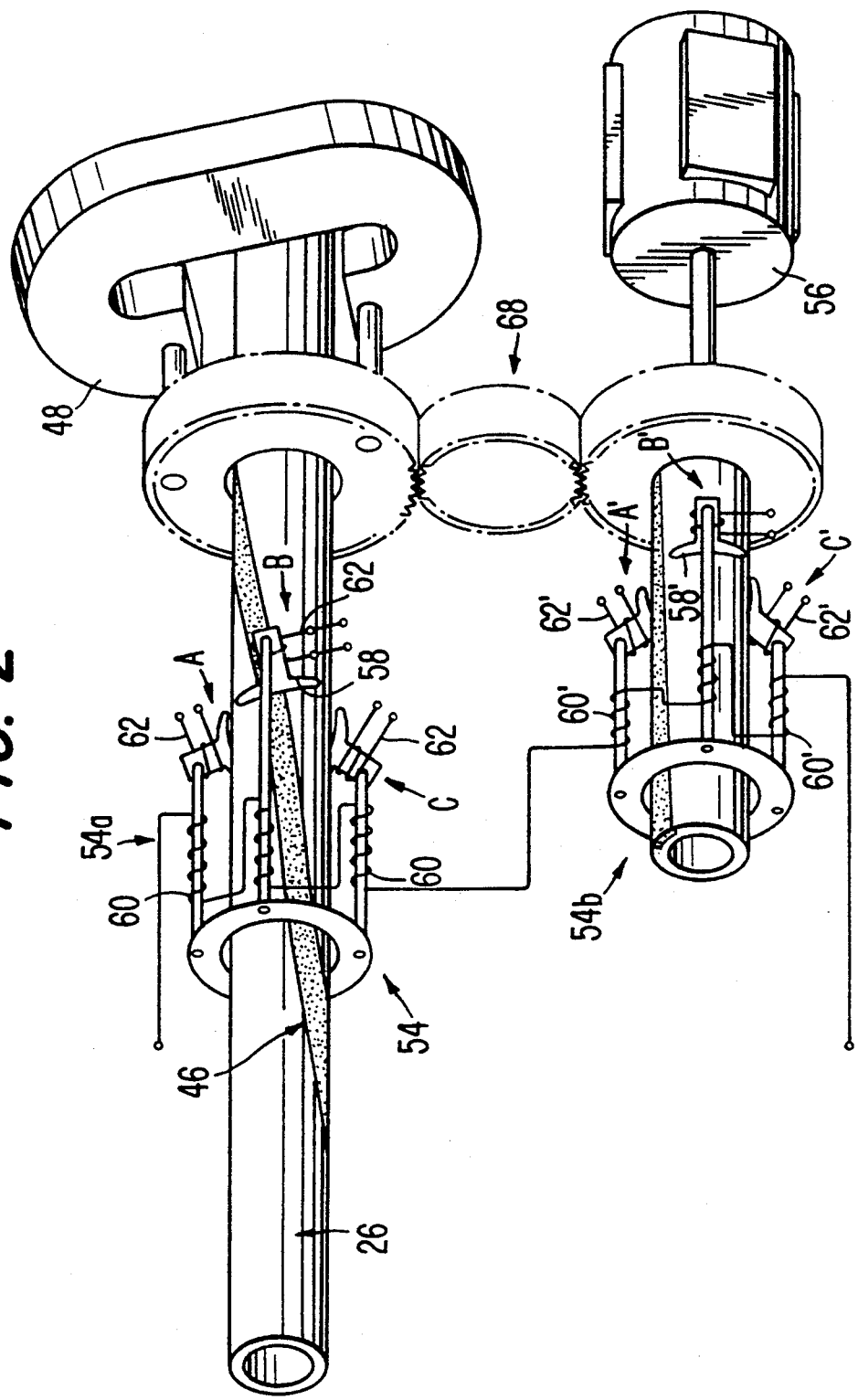
FIG. 2 is a diagrammatic perspective view of apparatus for synchronizing a rotating magnetic field with a helical magnetic strip.
Figure 3:
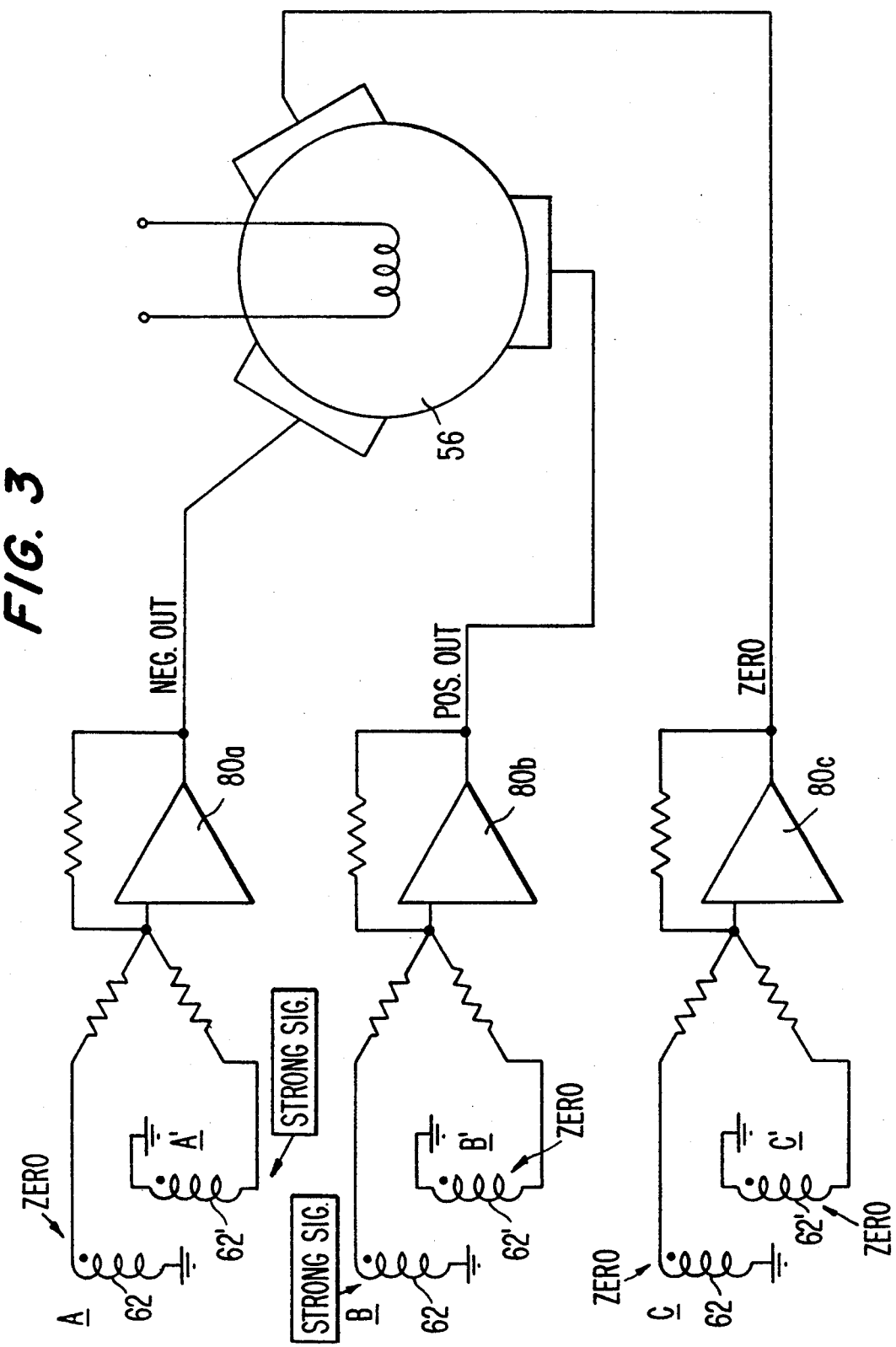
FIG. 3 is a circuit diagram corresponding to the apparatus shown in FIG. 2.

Shown adjacent to each magnetizing head in FIG. 1 is a sensor 52 for synchronizing each head with the rotation of the magnetic strip about the axis of the tube. Many different types of sensors may be employed, including magnetic (e.g., Hall probes), optical, or ultrasonic sensors, for example. FIGS. 2 and 3 illustrate a magnetic sensor 54 employed in a circuit with a synchro 56 for maintaining a magnetizing head (e.g., 48) synchronized with the helical strip 46 of magnetic material.

As shown in FIG. 2, extruded tube 26 bearing a strip 46 of magnetic material is surrounded by an assembly 54a of three magnetic sensor elements A, B, C. Each sensor element has a magnetic core structure 58 provided with a drive winding 60 and a signal winding 62. A similar sensor assembly 54b surrounds a reference sample 64, e.g., a length of plastic pipe bearing a helical magnetic strip 66. The components of sensor assembly 54b corresponding to those of sensor assembly 54a are designated by the same reference characters primed. The signal windings 62' associated with the reference sample will be referred to as feedback windings.

The magnetizing head 48 is coupled to synchro 56 by a gear train 68. Although shown diagrammatically, the magnetizing head is preferably an electromagnet having pole pieces that are shaped to provide the desired concentrated magnetic field widthwise of the strip 46.

Figure 4:
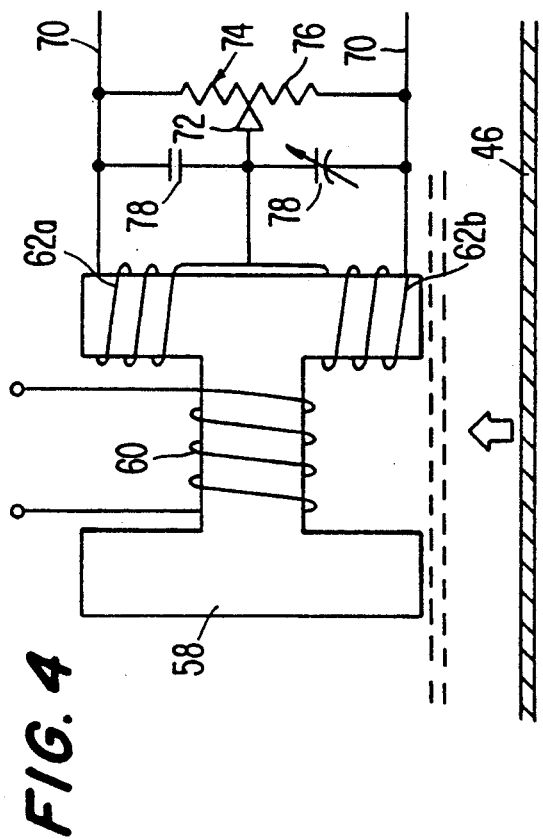
FIG. 4 is a diagram illustrating a portion of the apparatus of FIGS. 2 and 3 in greater detail.

FIG. 4 illustrates a preferred form of each of the sensor elements indicated diagrammatically in FIG. 2. Each sensor element (A, B, or C) comprises an H-shaped core 58, which may be made of ferrite or silicon steel laminations, for example. The drive winding 60 is mounted on the bridge of the core. All of the drive windings may be driven in series, as shown in FIG. 2, from a suitable AC source (a low frequency source, such as a 60 Hz source, or a high frequency source, such as a 6,000 Hz source). The signal winding 62 comprises a pair of coils 62a, 62b wound on opposite ends of one leg of the core. Conductors 70 connected to the remote ends of the coils provide an output. Adjacent ends of the coils are connected to a tap 72 of a potentiometer 74 having a resistance 76 that is connected across the conductors 70. The tap is adjustable for balancing the coils, so that there is no output signal when the sensor element is remote from the magnetic strip 46. The balancing arrangement may also comprise a pair of capacitors 78 connected in series across coils 62a, 62b, at least one of the capacitors being adjustable. When the magnetic strip 46 approaches an end of the core 58, as indicated by the arrow in FIG. 4, the coils 62a, 62b become unbalanced and produce an AC output signal.

FIG. 3 illustrates a circuit that may be employed with the apparatus of FIG. 2 for maintaining the position of the magnetizing head 48 synchronized with the position of the helical strip 46. As shown, the signal windings 62 are connected to inputs of amplifiers 80a, 80b, 80c in opposition to corresponding feedback windings 62'. The outputs of the amplifiers drive the control windings of the synchro 56. It may be assumed that in an initial set-up operation, the magnetizing head 48 is adjusted to the desired position relative to the strip of magnetic material and that the sensor assemblies 54a, 54b are positioned relative to the strip 46 and the strip 46', respectively, so that the synchro system is in equilibrium. In the example shown in FIG. 3, it is assumed that the synchro system is out of equilibrium and that the magnetic strip being extruded is adjacent to sensor element B, while the reference strip is adjacent to sensor element A'. Amplifier 80a therefore produces a negative output, and amplifier 80b produces a positive output. Amplifier 80c produces a zero output. The synchro 56 rotates the magnetizing head 48 until any outputs of the signal windings are cancelled by the outputs of the respective feedback windings, whereupon the position of the magnetizing head will be synchronized with the extruded magnetic strip.

In the apparatus shown in FIG. 1, a strip of magnetic material is coextruded with a plastic tube constituting a substrate, so that magnetic material is applied to a portion only of the substrate. In a modification of the invention, the magnetic material is coextensive with the substrate. In such a modification, the second extruder is not used. The magnetic material is mixed with the resin supplied to the first extruder and thus is incorporated in the material from which the tube is extruded. Nevertheless, a helical permanent magnet pattern is formed by rotating the magnetizer heads about the axis of the tube as the tube is advanced from the extruder. The magnetizing field, which is transverse to the length of the tube, may be applied diametrally across the entire width of the tube, in which case north and south poles are formed at opposite ends of the diameter of the tube in any cross-sectional plane, or may be applied across only a portion of the width of the tube, in which case the width of the magnetized strip will be less than the width of the tube.

As is apparent, the permanent magnet helical pattern formed by the invention becomes a permanent part of an elongated substrate, such as a tube. As described in the aforesaid co-pending applications, the helical pattern may have a pitch of about 12 feet, for example. The permanent magnet pattern need not be continuous, but may, if desired, be defined by successive segments of magnetic material, which, individually, need not be helical. The pattern may be in the form of a strip or stripe ½ inch wide and 1/16 inch thick, for example, but when the magnetic material is distributed throughout the material of the tube, the pattern may have a width equal to the full width of the tube and a thickness equal to the full wall thickness of the tube. In such an embodiment, a diametral magnetic axis "rotates" in successive transverse planes along the length of the elongated substrate, simulating a diametral strip that is twisted about its longitudinal axis. The magnetic pattern is actually constituted by a pair of helical strips, at opposite sides of a "rotating" diametral magnetic axis.

Figure 5:
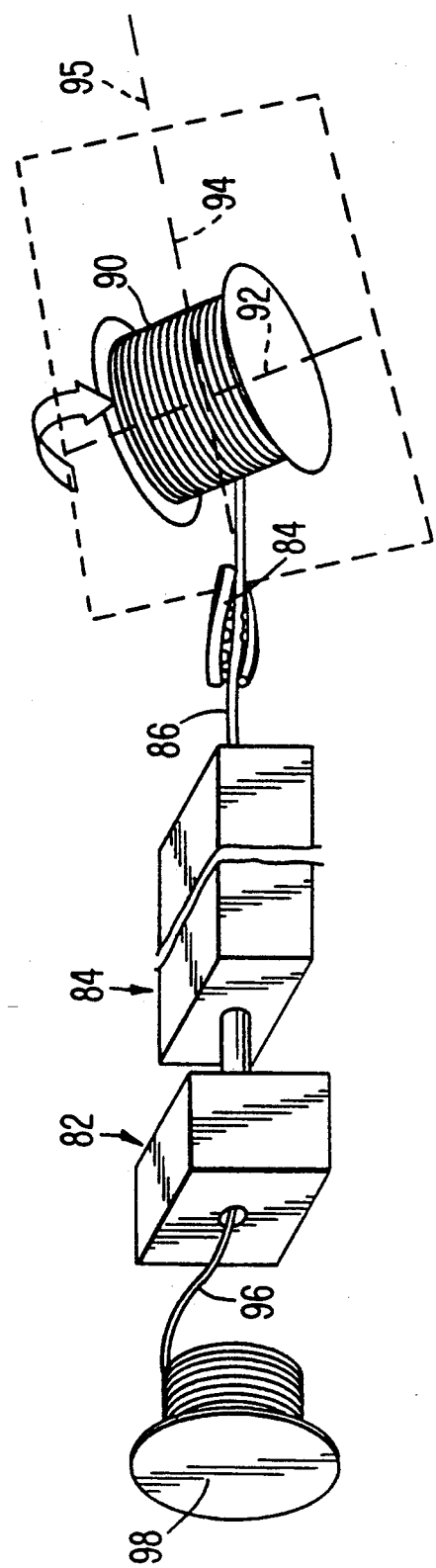
FIGS. 5–8 are diagrammatic perspective views of apparatus employed in further embodiments of the invention.

FIG. 5 illustrates another embodiment of the invention. In FIG. 5, an extruder 82 and sizer/cooler unit 84 are shown diagrammatically. The extruder may comprise a single extrusion head for extruding plastic duct, pipe, or tube (constituting a substrate) from resin mixed with magnetic material, or a dual extrusion head for applying a strip of magnetic material to a substrate by coextrusion. However, unlike the apparatus of FIG. 1, even if the strip is applied by coextrusion, the strip extruder die is stationary, so that a straight strip is applied parallel to the length of the substrate. The magnetic material is magnetized transverse to the length of the substrate by magnetizing heads as in FIG. 1, but they are stationary.

In the embodiment of FIG. 5, a tube 86 with magnetic material applied thereto is drawn out of the sizer/cooler unit 84 by a drive unit 88 and is wound upon a take-up spool 90 which rotates about a winding axis 92. To form the magnetic material into a longpitch helix, the take-up spool is also rotated about an axis 94 perpendicular to the winding axis 92 and substantially parallel to the length of the tube advanced from the drive unit. For this purpose, the take-up spool and the drive unit are mounted on a slowly rotating yoke 95, as indicated diagrammatically in FIG. 5. The rotation of the yoke is transmitted by the relatively stiff plastic being wound on the spool to the relatively soft plastic in the sizer/cooler unit, providing a long-pitch twist that forms the desired helical pattern. Because of the twist imparted to the plastic tube, the drive unit 88 may have an arrangement of rollers that is also twisted to accommodate the twist of the tube.

FIG. 5 also illustrates a cable 96, such as a fiber optic cable, being inserted into a duct as it is extruded. The cable is drawn off of one end of a stationary spool 98 and fed into the extruder for insertion into the duct as it is formed. Drawing the cable off of an end of a stationary spool will impart a twist to the cable, which can be removed by the twisting rotation of the take-up spool about axis 94, assuming that the stationary spool 98 is of an appropriate size and that the cable is unwound from the spool 98 in the proper direction.

In the foregoing embodiments of the invention, magnetic markers are manufactured concurrently with the manufacture of elongated substrates, such as plastic tubes or ducts. Embodiments will now be described in which elongated objects are provided with magnetic markers in the field, in situ, as the objects are buried in the ground.

Figure 6:
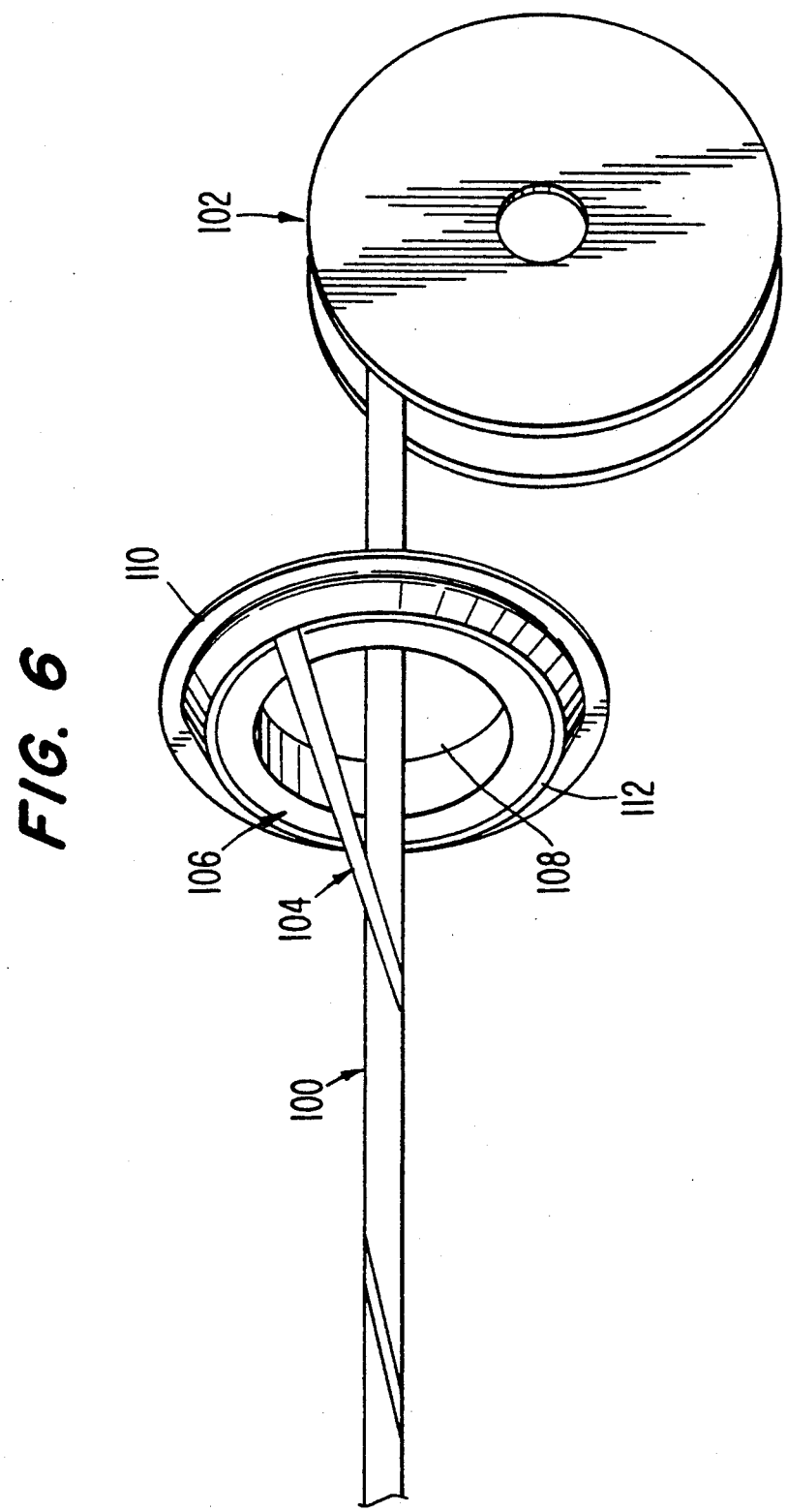

As shown in FIG. 6, an elongated object 100, such as a conduit or fiber optic cable, is advanced from a rotating supply reel 102 for burial in a trench (not shown). During the advancement of the object, a magnetic marker tape or strip 104 of flexible magnetic material magnetized transverse to its length is pulled off of one end of a stationary supply reel 106 having a central opening 108 through which the elongated object 100 is advanced. The tape is wound on its supply reel in successive turns or layers in a conventional manner. A leading end of the tape is attached to a leading end of the elongated object (adhesively, for example). As the elongated object is advanced, the tape 104 is pulled from its supply reel 106 and wrapped helically about the object 100 (which constitutes a substrate) by virtue of the fact that the point at which the tape leaves the end of its stationary supply reel progresses around the circumference of the reel as successive turns of tape unwind. The tape supply reel 106 may be provided with a shroud 110 surrounding the reel and defining with the outer periphery of the reel a circular slot 112 through which the tape is pulled under tension.

Figure 7:
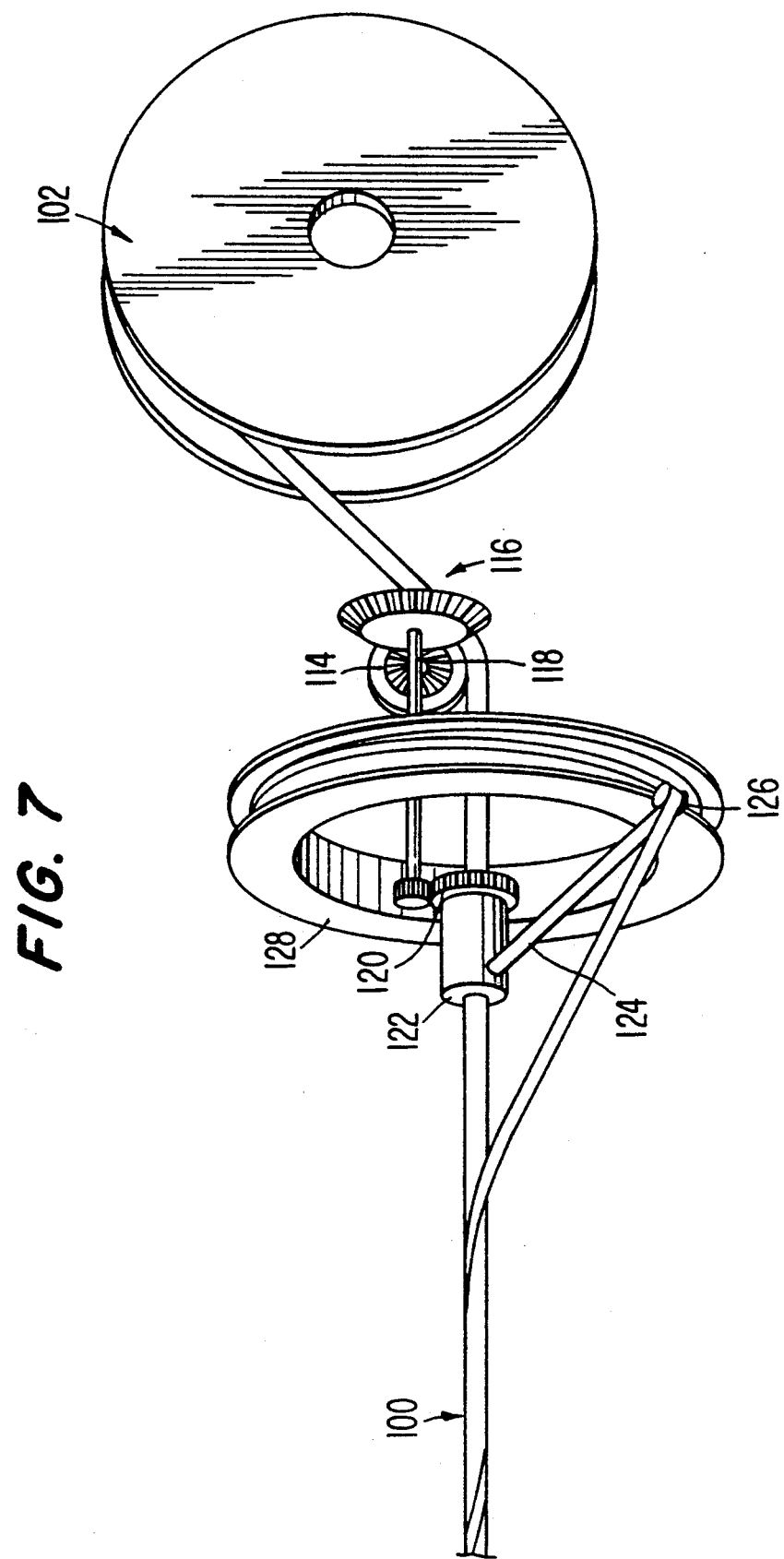

FIG. 7 shows a modification of the apparatus of FIG. 6. In the apparatus of FIG. 7 the elongated object 100 being drawn from its rotating supply reel 102 drives a pulley 114, which drives a gear train 116 comprising a plurality of gears, a driving gear 118 being fixed to the pulley and a driven gear 120 being fixed to a hollow shaft 122 that rotates about the elongated object as the object is drawn through the shaft. The hollow shaft supports an arm 124 with a tensioning pulley 126 (tape guide) at its free end. The magnetic marker tape 104 is advanced over the tensioning pulley from a freely rotating tape reel 128 through which the elongated object 100 is pulled. Rotation of the hollow shaft 122 causes the magnetic marker tape 104 to be wound helically upon the elongated object 100 (the leading end of the tape being affixed to the object).

In the foregoing embodiments of the invention, an elongated object supports a helical magnetic marker strip or tape, and the diameter of the helical turns is determined by the diameter of the elongated object. As the diameter of the object is made smaller and smaller, the diameter of the helical turns becomes smaller and smaller, and if the diameter of the object is reduced to zero, i.e., the object is eliminated as a substrate for the magnetic marker, the marker becomes a strip or tape that is merely twisted lengthwise. Due to the twisting, the magnetic axis of the marker varies along the length of the marker and thus produces a magnetic signature with peaks and valleys similar to the signature produced by the helical magnetic markers previously described.

In one of the embodiments disclosed in the aforesaid co-pending applications and referred to earlier herein, a magnetic marker is formed by magnetizing a tube diametrally and rotating the magnetic axis progressively in successive cross-sections of the tube along its length. As described in the co-pending applications, such a magnetic marker acts like a magnetic strip that is twisted lengthwise. An embodiment will now be described in which a twisted magnetic tape forms a magnetic marker in association with an elongated object, the twisting of the tape being produced in situ as the object is advanced for burial.

Figure 8:
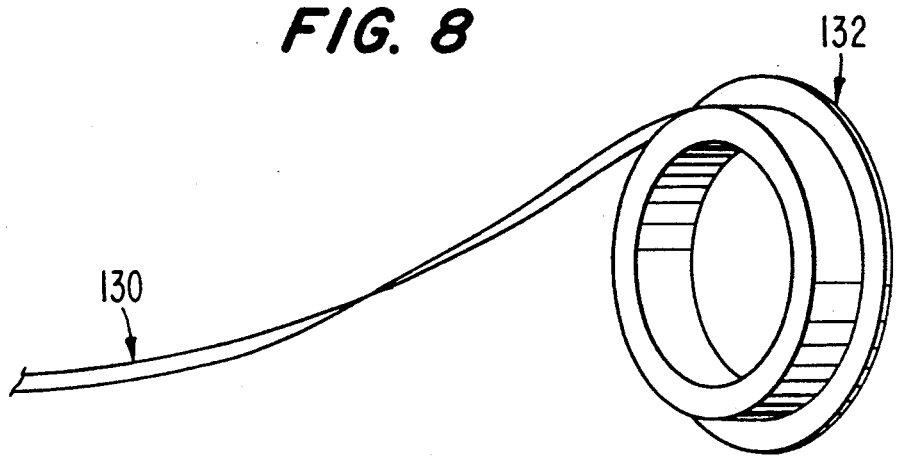

FIG. 8 shows a magnetic warning tape 130 being pulled off of one end of a stationary reel 132 on which the tape has been wound in a conventional manner. Due to the fact that the point at which the tape leaves the reel moves progressively along the circumference of the reel as the tape is pulled from the reel, the tape becomes twisted lengthwise, as shown. The length of each twist segment depends upon the diameter of the turns of tape on the reel. The warning tape may be buried in a trench above a fiber optic cable or duct, for example, as the cable or duct is buried in the trench.

Figure 9:
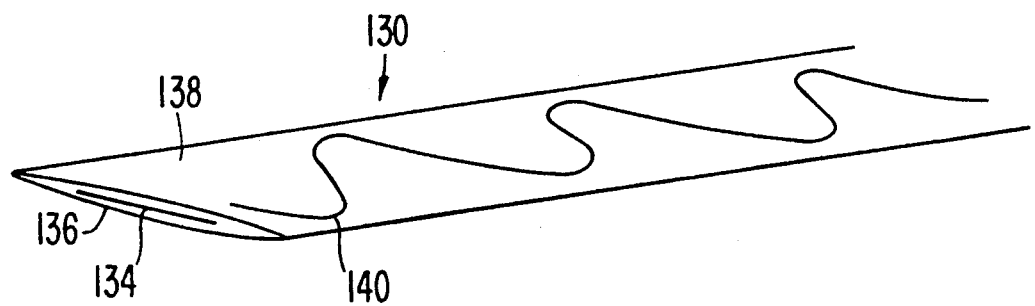
FIG. 9 is a diagrammatic perspective view of a magnetic marker tape that may be employed in the invention.

In the case of a warning tape that is not supported by an elongated object, it is desirable that the tape be reinforced to prevent breakage if hooked by earth digging equipment. Thus, as shown in FIG. 9, the tape 130 may comprise a plastic magnetic strip 134 formed in a pocket 136 of, and laminated with, a plastic cover 138 having a reinforcing fiber string 140 (or strings) with service loops embedded in the material of the plastic cover. In this embodiment, the plastic cover (or even the matrix material of the strip in which magnetic particles are distributed) constitutes a substrate for the magnetic material.

FIG. 10 illustrates a modification of the apparatus shown in FIG. 1, in which magnetic material is applied as a coating to the outer surface of an extruded plastic tube. A first extruder 142 extrudes a soft plastic tube 144, which then passes through a sizer/cooler 146, as in FIG. 1. A second extruder 148 applies a coating of hot melt adhesive to the outer surface of the plastic tube advanced from the sizer/cooler. While the adhesive is still warm and tacky, the adhesive-coated plastic tube passes through a powder application chamber 150 supplied with magnetic powder (e.g., barium ferrite) from a hopper or other source 152. An ultrasonic agitator 154 forms a cloud or suspension of the magnetic powder in the powder application chamber.

Magnetic particles adhere to the adhesive as the adhesive-coated plastic tube is advanced through the powder application chamber. A magnet 156 mounted on a support rod 158 is inserted into the portion of the plastic tube in the powder application chamber to attract the magnetic particles to the adhesive coating on the outer surface of the plastic tube, thereby concentrating the magnetic particles into a substantially continuous surface layer 160. A third extruder 162 applies a protective coating 164 of plastic over the magnetic material. The extruders in FIG. 10 are shown diagrammatically for simplicity, but in practice they will include the usual components, including pressurized supplies of the materials to be extruded (e.g., hoppers and extrusion screws, or a metering pump for the hot melt adhesive).

Although not shown in FIG. 10, a rotating magnetizer head may be provided between the powder application chamber 150 and the extruder 162 (or after the extruder 162) to produce a helical magnetic pattern in the magnetic material coating. The magnetic field may be applied across the full width of the plastic tube or across only a portion of the width.

The apparatus and method illustrated in FIG. 10 may be used to provide spaced bar magnets employed in some of the embodiments of the aforesaid Ser. No. 418,757 wherein longitudinally magnetized segments of a plastic tube provide a characteristic magnetic signature that depends upon the polarity of successive magnetized segments. In such embodiments, the magnetic material may be applied to the plastic tube periodically (as by periodic interruption of the supply of magnetic powder), and the resultant segments of magnetic material may be magnetized longitudinally by one or more magnetizer heads that apply a longitudinal magnetic field to the segments of magnetic material with a polarity appropriate to the desired polarity of the magnetized segments.

The apparatus shown in FIG. 10 has at least two advantages over the modified apparatus of FIG. 1 in which the second extruder is eliminated and the magnetic material is mixed with the plastic from which the tube is extruded. First, it eliminates the need to mix or compound the magnetic material with the plastic, avoiding the difficulty of extruding heavily loaded plastic. Second, it eliminates gaps between magnetic particles, increasing the magnetic strength while yielding a tube with superior properties.

As set forth in the co-pending applications, buried elongated objects provided with magnetic markers in accordance with the invention may be detected by a magnetic field measuring device or gradiometer. When a magnetic detector is moved over the ground along the length of the buried object, a unique magnetic field signature is produced comprising a series of positive and negative excursions (peaks and valleys) in the output of the detector. This signature is produced by a helical or twisted permanent magnet pattern (which causes the orientation of the magnetic axis to vary), or by the additive/subtractive fields of successive longitudinally magnetized magnetic segments, and is quite useful in identifying the buried object and in distinguishing the object from other objects, such as ferrous gas and water pipes, that produce random positive and negative excursions. Buried objects, such as fiber optic cables, are located, traced, and identified at substantial distances, easily and reliably, by virtue of the magnetic markers of the invention.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A magnetic marker capable of being located and identified when hidden from view, comprising an elongated flexible strip of magnetic material magnetized transverse to its length and twisted lengthwise so as to provide a magnetic field that varies repetitively along the length of the strip in a pre-determined manner, whereby the strip can be located and identified by detecting variations of the magnetic field with a magnetic field detector moved along the length of the strip.

* * * * *